United States Patent
Lee et al.

(10) Patent No.: US 6,669,146 B2
(45) Date of Patent: Dec. 30, 2003

(54) METHOD FOR PROVIDING GLIDING AND TRAJECTORY CONTROL OF A PARACHUTE CLUSTER ASSEMBLY

(75) Inventors: Calvin K. Lee, Needham, MA (US); John E. Buckley, Marlboro, MA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/867,246

(22) Filed: May 29, 2001

(65) Prior Publication Data

US 2002/0179774 A1 Dec. 5, 2002

(51) Int. Cl.[7] .............................................. B64D 17/02
(52) U.S. Cl. ...................................... 244/145; 244/142
(58) Field of Search ............................... 244/142, 145, 244/138 R, 152

(56) References Cited

U.S. PATENT DOCUMENTS

| | | | | |
|---|---|---|---|---|
| 1,287,134 A | * | 12/1918 | Swanson | |
| 2,048,159 A | * | 7/1936 | Hoffman | |
| 2,993,668 A | * | 7/1961 | Gold | |
| 3,170,660 A | * | 2/1965 | Kehlet | |
| 3,423,054 A | | 1/1969 | Stencel | 244/149 |
| 3,848,834 A | * | 11/1974 | Phillips | |
| 3,958,780 A | * | 5/1976 | Matsuo et al. | |
| 4,078,744 A | * | 3/1978 | Heinrich | |
| 4,699,338 A | * | 10/1987 | Penberthy | |
| 4,752,050 A | | 6/1988 | Johnson | 244/152 |
| 4,955,563 A | | 9/1990 | Lee et al. | 244/152 |
| 5,678,788 A | * | 10/1997 | Hetzer et al. | |

* cited by examiner

Primary Examiner—Tien Dinh
(74) Attorney, Agent, or Firm—Vincent J. Ranucci

(57) ABSTRACT

A parachute cluster assembly includes a first round parachute having a first canopy of radially extending first gores, and a second round parachute having a second canopy of radially extending second gores. Adjacent ones of the first gores are joined along a line to adjacent ones of the second gores to fix the first canopy to the second canopy along the line. The first canopy defines a first slot spaced from but neighboring the first gores joined along the line, and the second canopy defines a second slot spaced from but neighboring the second gores joined along the line. The first and second slots are disposed on a same side of the cluster assembly.

4 Claims, 6 Drawing Sheets

US 6,669,146 B2

METHOD FOR PROVIDING GLIDING AND TRAJECTORY CONTROL OF A PARACHUTE CLUSTER ASSEMBLY

STATEMENT OF GOVERNMENT INTEREST

The invention described herein may be manufactured and used by and for the Government of the United States of America for Governmental purposes without the payment of any royalties thereon.

BACKGROUND OF THE INVENTION

1. Field of the Invention

The invention relates to a high altitude survivable precision airdrop system, and is directed more particularly to a cluster of round parachutes for high altitude heavy cargo delivery.

2. Description of the Prior Art

High altitude parachute airdrop delivery significantly reduces aircraft vulnerability to ground fire, and precision airdrop provides precise delivery of payloads where needed. Such systems reduce drop zone sizes and load dispersion for quick airdrop mobility. Typically, ram-air parafoils have been relied upon for high altitude precision airdrops. Because of their high manufacturing costs, there is interest in using lower cost round parachutes for guided precision airdrops. However, circular parachutes inherently do not provide the desired glide capability.

For heavy cargo delivery, clusters of round parachutes often are needed. The glide and control of clustered round parachutes have proven problematic. The motion of clustered parachutes is highly random, depending on the flow interaction among the individual parachute canopies and the prevailing wind conditions. Individual glide and control methods applied to each canopy may work with respect to individual canopies, but when the canopies are clustered together, the random geometry of the cluster, the complicated flow conditions of the canopies and their interaction have made it almost impossible to exert glide and control for the cluster as a whole.

Accordingly, there is a need for a new clustered round parachute assembly that provides a capability for gliding and control.

SUMMARY OF THE INVENTION

An object of the invention is, therefore, to provide a high altitude precision airdrop system including clustered round parachutes for delivering of heavy cargo.

With the above and other objects in view, as will hereinafter appear, a feature of the present invention is the provision of a parachute cluster assembly comprising a first round parachute having a first canopy of radially extending first gores, a second round parachute having a second canopy of radially extending second gores, with adjacent ones of the first gores being joined along a line to adjacent ones of the second gores to fix the first canopy to the second canopy along the line. The first canopy defines a first slot spaced from but neighboring the first gores joined along the line, and the second canopy defines a second slot spaced from but neighboring the second gores joined along the line. The first and second slots are disposed on a same side of the cluster assembly.

In accordance with a further feature of the invention, there is provided a parachute cluster assembly comprising a first round parachute having a first canopy of radially extending first gores, a second round parachute having a second canopy of radially extending second gores, with adjacent ones of the first gores being joined along a line to adjacent ones of the second gores to fix the first canopy to the second canopy along the line. The first canopy defines a first slot extending substantially widthwise through a first group of adjacent gores neighboring the first gores joined along the line, the first slot being substantially concentric with a hem portion of the first canopy, and the second canopy defines a second slot extending substantially widthwise through a second group of adjacent gores neighboring the second gores joined along the line, the second slot being substantially concentric with a hem portion of the second canopy. The first and second slots are disposed on a same side of the cluster assembly.

The above and other features of the invention, including various novel details of arrangements and combinations of parts, will now be more particularly described with reference to the accompanying drawings and pointed out in the claims. It will be understood that the particular assemblies embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent.

In the drawings.

DESCRIPTION OF THE PREFERRED EMBODIMENT

Figure 1:
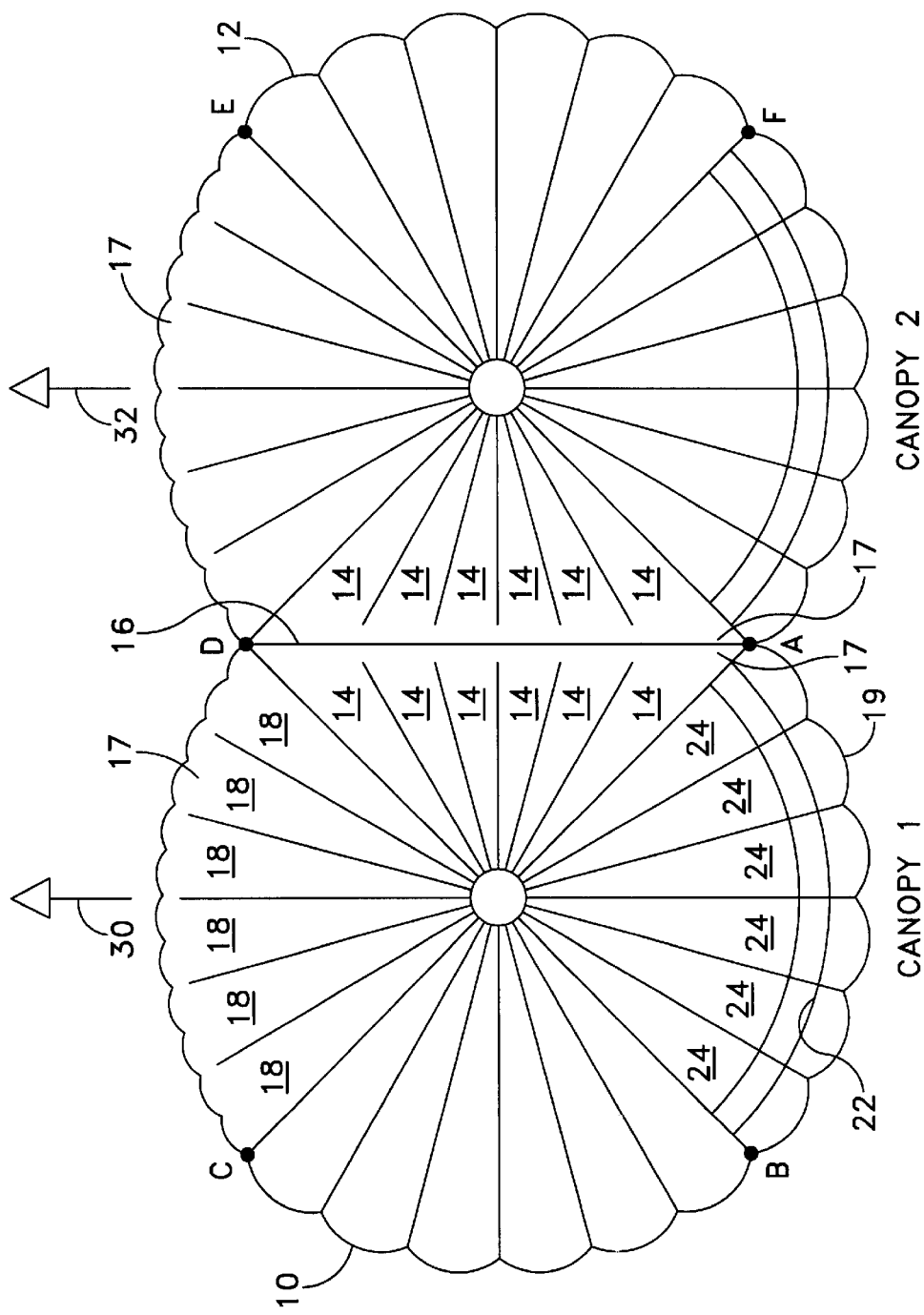
FIG. 1 is a generally top plan view of a cluster of two parachutes illustrative of an embodiment of the invention.
Figure 2:
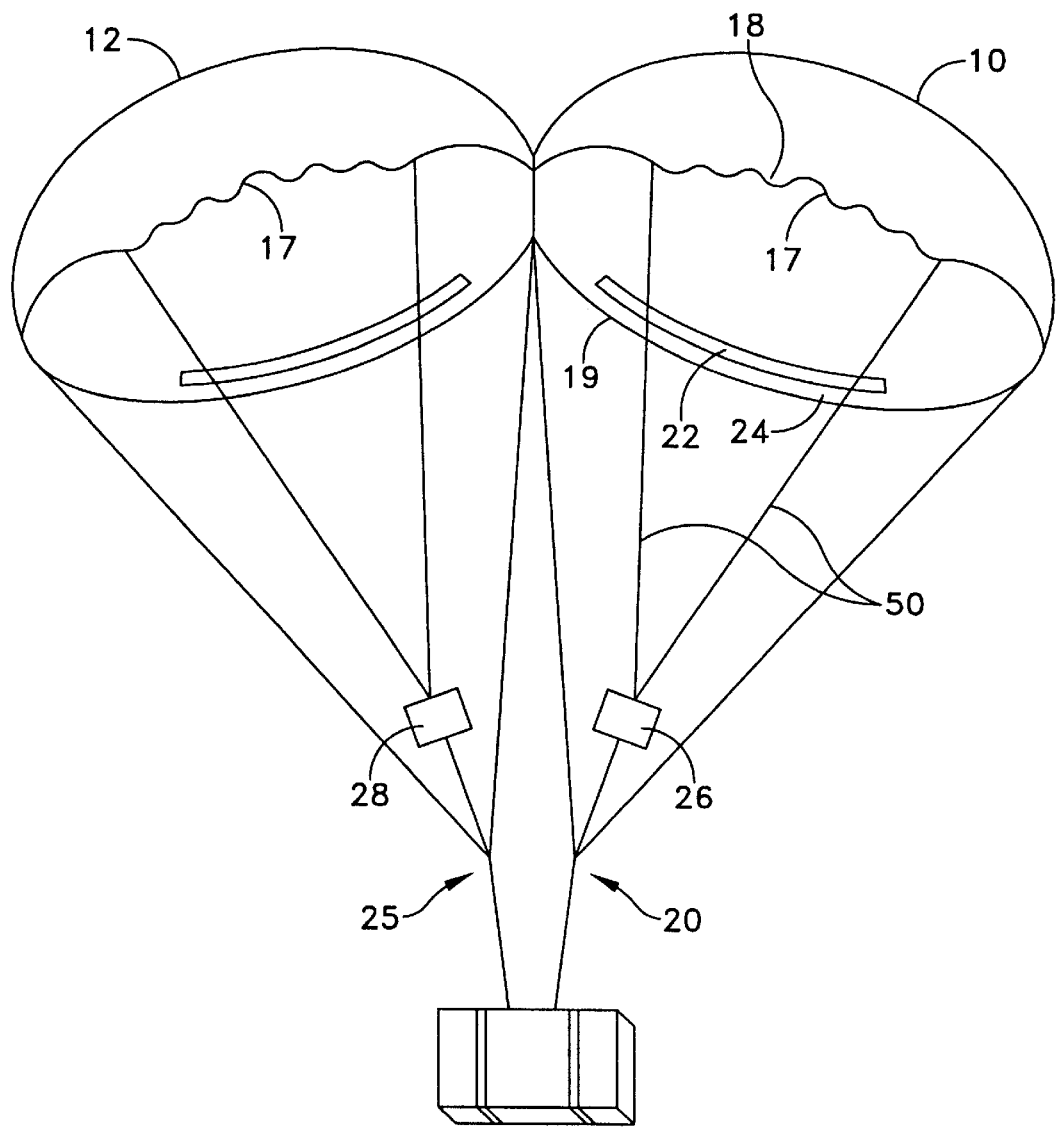
FIG. 2 is a side perspective view of the cluster of FIG. 1.

In FIGS. 1 and 2, the present invention is illustrated as applied to a two parachute cluster. For purposes of illustration, two twenty-four gore canopies 10, 12 are shown. Six gores 14 extending between A and D of each canopy are connected at a skirt portion 17. The skirt portion 17 of six pull-down gores 18 of canopy 10 between C and D is adapted to be pulled down toward a confluence point 20 (FIG. 2). A typical length of pull-down is about 10% of the canopy diameter. A narrow slot opening 22 is disposed near a skirt hem 19 on six gores 24 extending from A to B, directly opposite to the six pull-down gores 18. The same modifications are made on canopy 12, as shown in FIG. 1.

Referring to FIG. 2, canopy pull-down and release mechanisms 26, 28 are shown attached to canopies 10, 12 respectively. When the six pull-down gores 18 of canopy 10 are pulled down, the inflated canopy 10 is deformed (FIG. 2) to create a high velocity air jet emerging from the opposite side of the canopy, at gores 24 of canopy 10. The slot opening 22 near the skirt hem 19 enhances the jet effect. The net result of the modifications is to provide a thrust which glides canopy 10 forward, as shown by arrow 30 in FIG. 1. A similar thrust is generated for canopy 12, illustrated by arrow 32. Inasmuch as the two canopies 10, 12 are connected together, the cluster glides forward together as a whole. During the steady glide, if a turn toward the left is desired, the skirt portion 17 of canopy 10 is released by the pull down and release mechanism 26. In this unsymmetrical configuration, canopy 12 has a higher forward thrust than canopy 10. This creates a counter-clockwise torque for the cluster and rotates the cluster to the left. Similarly, if a right turn is desired, the skirt portion 17 of canopy 12 is released to achieve the right turn. To restore the steady forward glide after the left turn, the pull-down mechanism 26 is activated to pull the skirt portion 17 of canopy 10 down so that both canopies have the same forward thrust. Thus, by partially connecting two modified round canopies, glide and control of the cluster is achieved.

Figure 3:
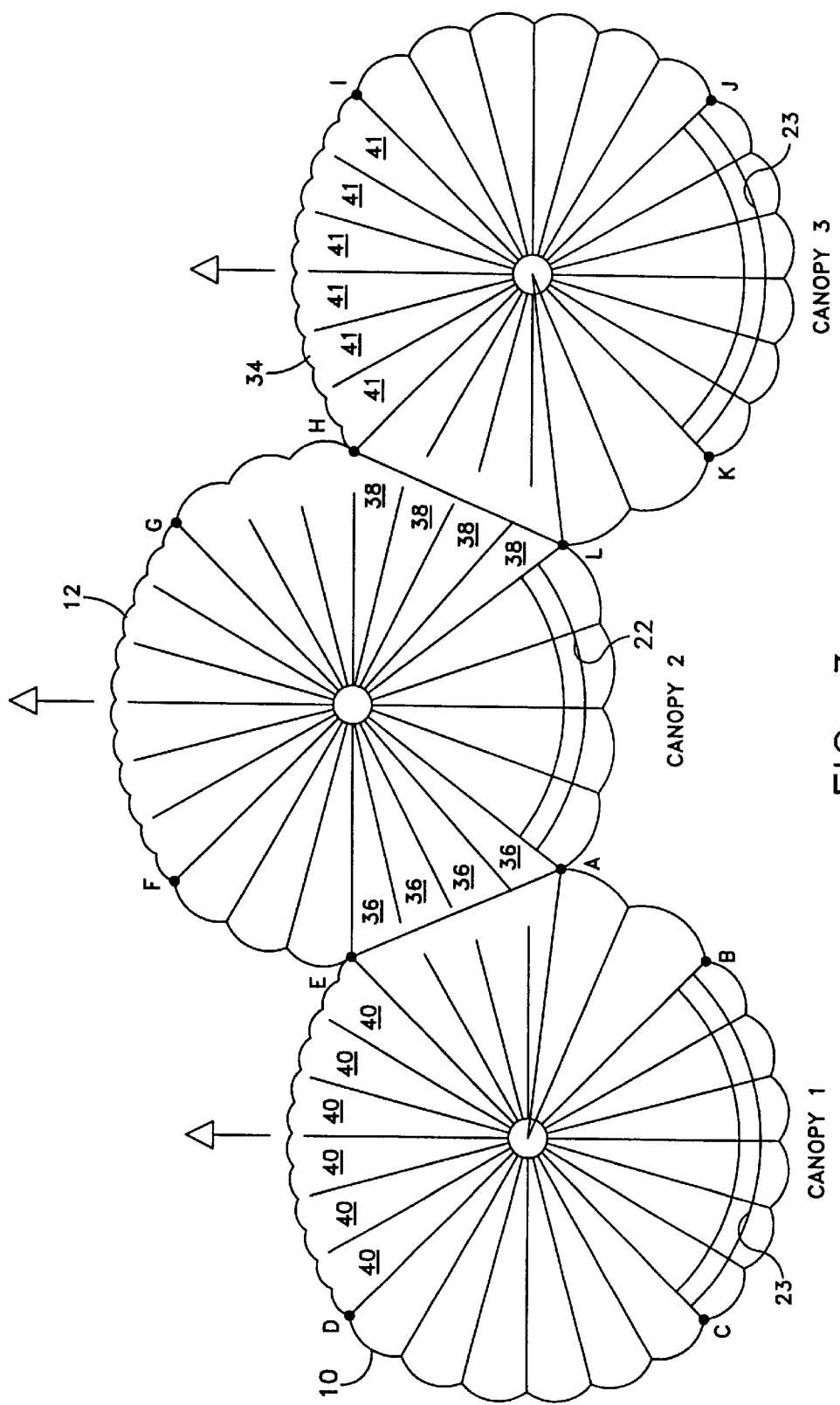
FIG. 3 is a generally top plan view of a cluster of three parachutes.

In FIG. 3, there is illustrated the present invention applied to a three-parachute cluster. Three twenty-four gore canopies 10, 12, 34 are shown. For a more streamlined configuration, canopies 10 and 34 are connected to canopy 12 at an angle of 30 degrees with respect to the center diameter E–H of canopy 12. This results in a four gore 36 connection A–E between canopies 10 and 12, a four gore 38 connection H–L between canopies 12 and 34, and the four-gore slot opening 22 for canopy 12. Six gores are pulled down for all three canopies, and six-gore slot openings 23 are disposed in canopies 10 and 34. Similar to the two-canopy cluster, when three parachutes are connected and modified as described, a net forward thrust is generated to glide the cluster forward. If a left turn is desired, pull-down gores 40D–E of canopy 10 are released by pull-down and release mechanism 26 to generate a counter-clockwise torque for a turn. To restore to forward glide, pull down mechanism 26 pulls down the gores 40 for a net forward thrust. Similarly, a right turn can be made releasing the pull-down gores 41 of canopy 34. Thus, by partially connecting three modified round canopies 10, 12, 34, glide and control of the cluster is achieved.

Figure 4:
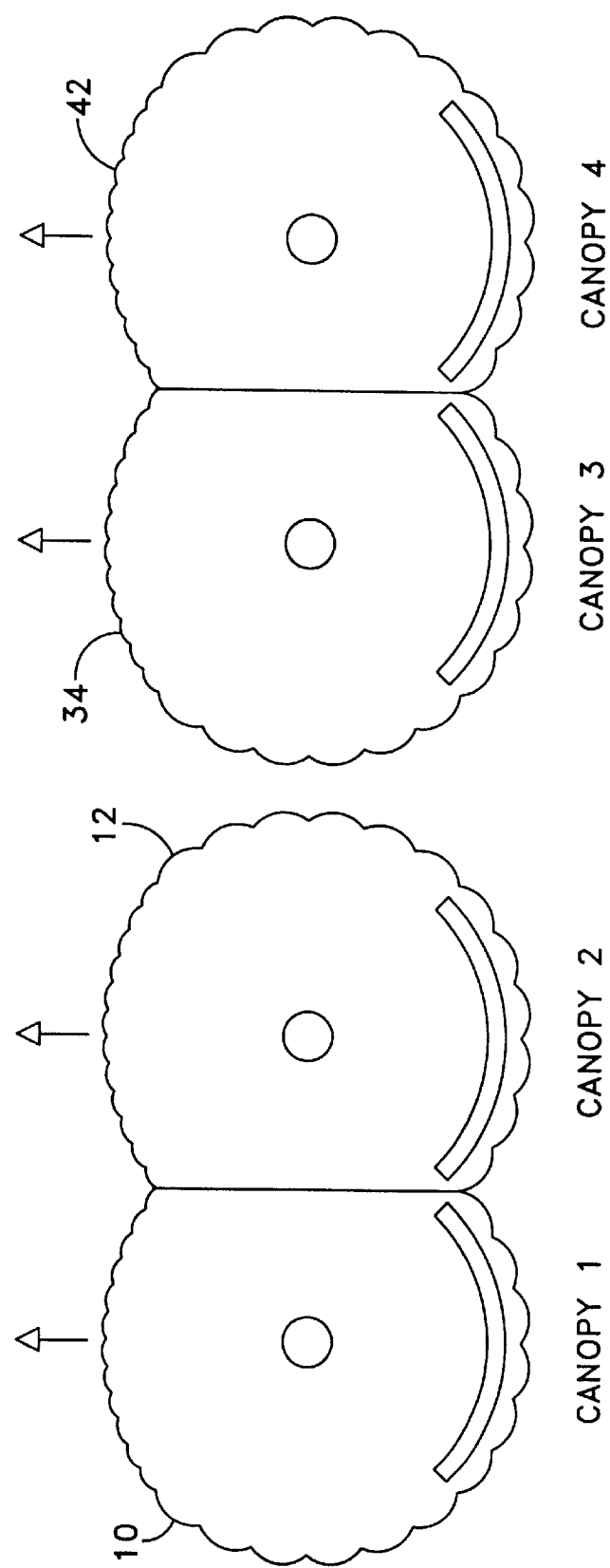
FIG. 4 is a generally top plan view of a cluster of four parachutes.
Figure 5:
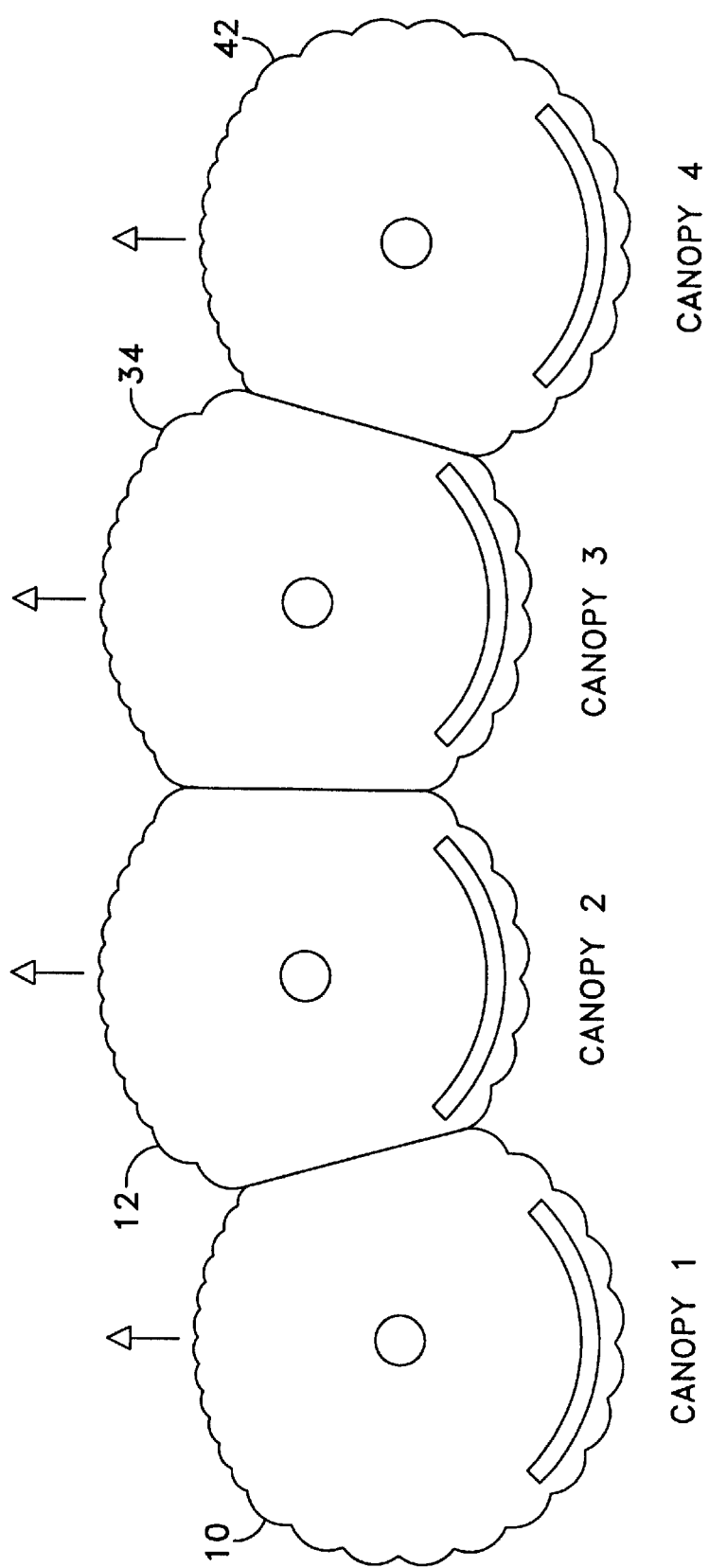
FIG. 5 is a generally top plan view of an alternative cluster of four parachutes.

The cluster layout and glide/control assembly shown in FIGS. 1–3 forms the basis for clusters of more than three parachutes. For a cluster of four parachutes, the cluster layout can be two clusters of two connected canopies 10, 12 and 34, 42, as shown in FIG. 4, or four connected canopies 10, 12, 34, 42 as shown in FIG. 5. Glide and turn control are achieved as described above using the pull-down gores. For the configuration shown in FIG. 4, the pull-down gores of both canopies 10 and 12 have to be used simultaneously for a left turn.

Figure 6:
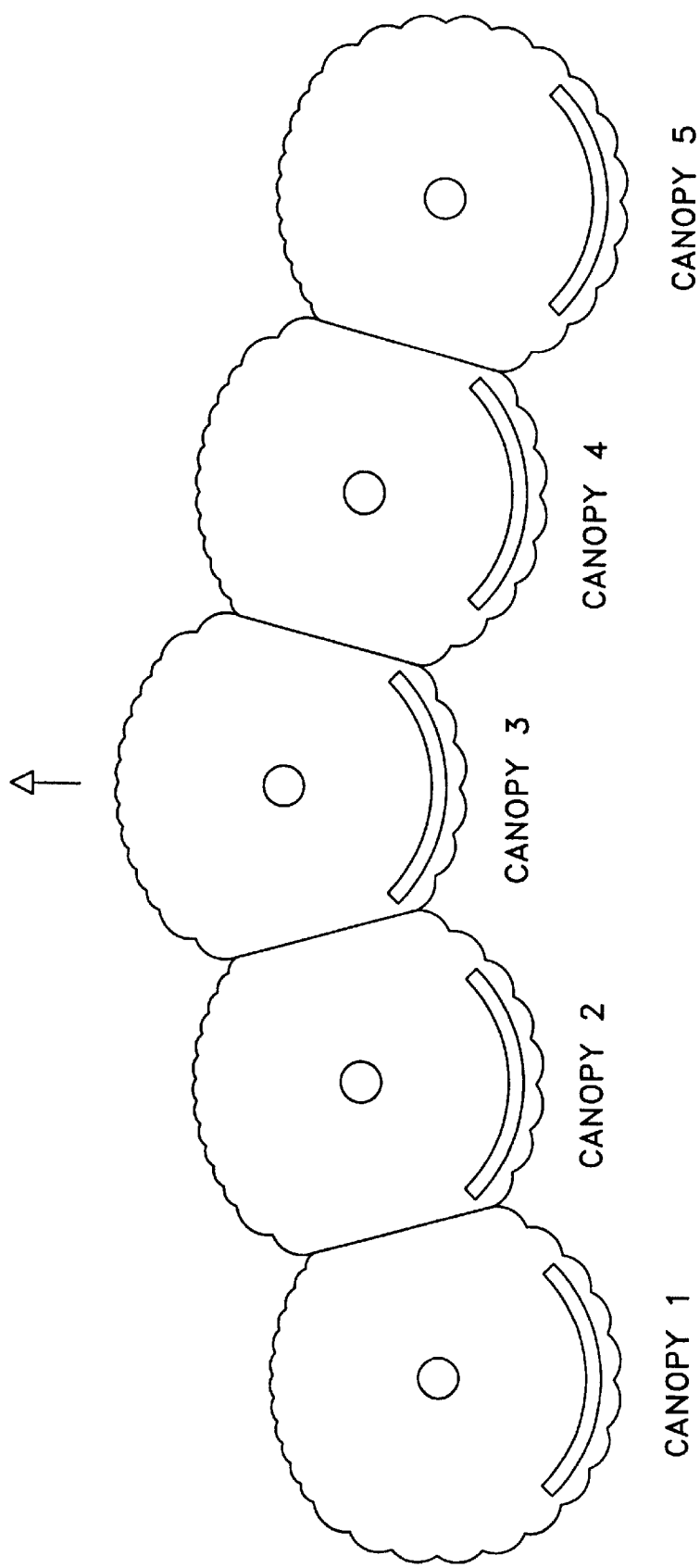
FIG. 6 is a generally top plan view of a cluster of five parachutes.

For a cluster of five parachutes, the cluster layout is shown in FIG. 6. For a cluster of six parachutes (not shown), the canopy layout can be two groups of three connected canopies shown in FIG. 3. Again, the glide and turn control are achieved as described above.

In a test, two sixty-four gore 16 foot diameter round parachutes were used to illustrate and demonstrate the new assembly for gliding and controllable clusters. The canopy layout was similar to that of FIGS. 1 and 2. The total slot opening area on the gores 24 near the skirt hem 19 of each canopy 10, 12 was 2–3% of the canopy area. The amount of pull-down of pull-down gores 18 was 10% of the canopy diameter. Sixteen gores of each canopy were connected at skirt portion 17. Full-scale flight tests were conducted at a drop zone. A differential global positional system (GPS) that provides one set of spatial position reading per second was used to monitor the spatial-time history of the cluster. For quick and convenient tests, pyrotechnic cutters were used as mechanisms 26, 28.

During parachute packing prior to a test, the pull-down gores of canopy 10 were pulled down via the corresponding suspension lines 50. There is a suspension line 50 for each gore of each canopy. A limited number of suspension lines 50 are shown in FIG. 2 for the sake of clarity. The pull-down was held in place by a 10-second pyrotechnic cutter attached at the confluence point 20. The pull-down gores of canopy 12 were tied in place permanently at a confluence point 25. At the end of 10 seconds after parachute deployment, the pyrotechnic cutter fired and released the skirt pull-down of canopy 10 to activate a turn. This simple technique enabled the study and demonstration of the gliding and turn control of the cluster. Other tests were conducted without the cutter arrangement to investigate the steady glide.

All tests were conducted in very low ground wind conditions of less than 5 miles per hour. The cluster and the load were released from the aircraft at about 1,200 feet. The cluster was static line deployed and opened quickly. After the canopies were fully opened, the cluster glided with the wind and the pull-down sections of the canopies led in the glide direction, as designed. For the tests equipped with a 10-second clutter, the cluster glided after opening. At the end of the 10 seconds, the cutter fired and released the skirt pull-down of one canopy. The cluster then made a left turn accordingly.

There is thus provided a new parachute cluster assembly, providing gliding and trajectory control of clustered parachutes. The assembly involves simply (1) providing a pull down portion of the skirt, (2) making slot openings opposite to the skirt pull-down portions, and (3) connecting the canopies. Steady glide is obtained when all the canopies are pulled down. Turn control is obtained by releasing the pull-down skirts of selected canopies.

It is to be understood that the present invention is by no means limited to the particular arrangements herein disclosed and/or shown in the drawings, but also comprises any modification or equivalent within the scope of the claims.

What is claimed is:

1. A method for providing gliding and trajectory control of a parachute assembly comprising:

providing a first round parachute having a first canopy of radially extending first gores; and a second round parachute having a second canopy of radially extending second gores; adjacent ones of the first gores being joined along a line to adjacent ones of the second gores to fix the first canopy to the second canopy along the line; the first canopy defining a first slot spaced from but neighboring the first gores joined along the line; and the second canopy defining a second slot spaced from but neighboring the second gores joined along the line;

the first and second slots being disposed on a same side of the cluster assembly; providing each of said first and second parachutes with a group of side-by-side pull down gores, and a pull-down and release mechanism connected to each of said groups of pull down gores by suspension lines, and said groups of pull down gores are adapted to be pulled and released by said mechanisms, the first and second slots being disposed opposite from the groups of pull down gores, respectively, and the mechanisms being operable independently of each other to effect turns of the assembly;

pulling in a downward direction, 1/4 of the skirt of the first canopy directly opposite of the slot of the first canopy, and 1/4 of the skirt of the second canopy directly opposite of the slot of the second canopy, the combination of the slots and the pulled-down skirts creating a strong air jet flow through and below the slots for forcing the cluster assembly in a forward direction of glide;

releasing the pulled-down skirt of one of the canopies for decreasing the forward gliding force of the canopy having the released pulled-down skirt in comparison to the forward gliding force of the other canopy, the difference in magnitude between the two forward gliding forces creating a turning moment to turn the cluster assembly in the direction of the canopy having the released pulled-down skirt for controlling a trajectory of the cluster assembly; and pulling down the released skirt for equalizing the forward gliding forces of both canopies for resuming the forward direction of glide of the cluster assembly, and thereby controlling the gliding and trajectory paths of the cluster assembly.

2. The method in accordance with claim 1 wherein said adjacent ones of the first gores and second gores joined along the line comprise ¼ to ⅙ of the gores of the first and second parachutes, respectively.

3. The method in accordance with claim 1 wherein said mechanisms are adapted to pull the groups of pull down gores a distance of about 10% of a diameter of the canopy from which the mechanism is suspended.

4. The method in accordance with claim 1 wherein each of the slots defines an area of about 2–3% of the area of the canopy in which the slot is disposed.

* * * * *